United States Patent
Purushothaman et al.

(10) Patent No.: US 9,430,502 B1
(45) Date of Patent: Aug. 30, 2016

(54) METHOD AND APPARATUS FOR COLLECTING AND STORING STATISTICS DATA FROM NETWORK ELEMENTS USING SCALABLE ARCHITECTURE

(75) Inventors: Mahesh Purushothaman, San Jose, CA (US); Debashis Dey, Dublin, CA (US); Ajaykumar L. Upadhyay, Cupertino, CA (US); Anand K. Palanisamy, Mountain House, CA (US)

(73) Assignee: Tellabs Operations, Inc., Naperville, IL (US)

( * ) Notice: Subject to any disclaimer, the term of this patent is extended or adjusted under 35 U.S.C. 154(b) by 1073 days.

(21) Appl. No.: 12/879,223

(22) Filed: Sep. 10, 2010

(51) Int. Cl.
 *G06F 7/00* (2006.01)
 *G06F 17/30* (2006.01)
(52) U.S. Cl.
 CPC ... *G06F 17/30289* (2013.01); *G06F 17/30371* (2013.01)
(58) Field of Classification Search
 CPC .................... G06F 17/30289; G06F 17/30371
 USPC ....................................................... 707/688
 See application file for complete search history.

(56) References Cited

U.S. PATENT DOCUMENTS

| | | | | |
|---|---|---|---|---|
| 6,308,328 | B1* | 10/2001 | Bowcutt | H04L 29/06 725/110 |
| 7,570,656 | B2* | 8/2009 | Raphaeli | H04B 3/542 370/445 |
| 8,289,183 | B1* | 10/2012 | Foss | 340/870.02 |
| 2003/0088664 | A1* | 5/2003 | Hannel et al. | 709/224 |
| 2004/0078461 | A1* | 4/2004 | Bendich et al. | 709/224 |
| 2004/0087031 | A1* | 5/2004 | Simon, Jr. | 436/100 |
| 2004/0153866 | A1* | 8/2004 | Guimbellot | H04L 1/22 714/4.11 |
| 2004/0215665 | A1* | 10/2004 | Edgar et al. | 707/200 |
| 2005/0203988 | A1* | 9/2005 | Nollet | G06F 15/7825 709/201 |
| 2006/0245369 | A1* | 11/2006 | Schimmelpfeng et al. | 370/252 |
| 2007/0099577 | A1* | 5/2007 | Lee et al. | 455/69 |
| 2007/0121516 | A1* | 5/2007 | Hannel et al. | 370/241 |
| 2007/0206566 | A1* | 9/2007 | Bennett | H04L 12/66 370/352 |
| 2009/0164657 | A1* | 6/2009 | Li et al. | 709/233 |
| 2009/0210338 | A1* | 8/2009 | Hor et al. | 705/37 |
| 2010/0318859 | A1* | 12/2010 | Augusto et al. | 714/57 |
| 2011/0040733 | A1* | 2/2011 | Sercinoglu et al. | 707/688 |
| 2011/0047555 | A1* | 2/2011 | Lakshmanan | G06F 9/5088 718/105 |

* cited by examiner

*Primary Examiner* — Mark E Hershley
(74) *Attorney, Agent, or Firm* — James M. Wu; JW Law Group

(57) ABSTRACT

A method and apparatus for collecting statistics data over a communications network using scalable stateless processes are disclosed. A process capable of obtaining statistics data, in one embodiment, detects a delay associated with the availability of statistics data in accordance with predefined lag duration, and subsequently, adds one or more stateless processes to a pool of stateless processes to increase capacity of collecting statistics data. Upon enabling a stateless process to collect statistics data from network element ("NE") in response to a statistics collecting tasks, the statistics data is stored in a database.

20 Claims, 5 Drawing Sheets

METHOD AND APPARATUS FOR COLLECTING AND STORING STATISTICS DATA FROM NETWORK ELEMENTS USING SCALABLE ARCHITECTURE

FIELD

The technical field of embodiments of the present invention relate to data transfer in a communications network. More specifically, embodiments of the present invention relate to collecting and processing statistics using a scalable architecture.

BACKGROUND

With increasing demand for more information to be supplied to homes and/or businesses, network communication providers have been continuously upgrading and expanding their networks' performance as well as capacity. When a network, for instance, reaches its service capacity, additional network equipments are typically added to improve overall network capacity to meet such demand. For example, a communications network can add network equipment such as routers and switches to keep up with the demand. A problem associated with a growing network, however, is to keep up with statistics collection from all nodes and/or network elements ("NEs") whether they are existing NEs or newly added NEs in the network.

Traditionally, statistics collection over a communications network involves downloading statistics files from NEs, processing the statistics files, and producing output files on a defined time period. For example, output files are typically generated based on collected statistics files and are available for review within the time period such as every 15 minutes. When a network grows, new NEs or nodes are added and consequently, the statistics from the newly added NEs and nodes need to be collected and processed. Accordingly, the load on the statistics data collector increases when the network grows. As the network grows, the scalability and performance issues cause statistics collection to lag behind over a large network. As such, a delay in availability of statistics data can occur if a network grows.

Since large amount of statistics data is processed and stored on a regular interval, a conventional approach for handling such massive amount of data is to store the data in a file format such as a comma separated value ("CSV") file. If a report is desirable, the report will be generated from, for example, CSV files.

SUMMARY

Embodiments of the present invention disclose a method for collecting statistics data over a communications network using scalable stateless processes. A method, for example, detects a delay associated with the availability of statistics data in accordance with a predefined lagging duration, and subsequently, adds one or more stateless processes to increase the capacity of processing power. Upon enabling one of stateless processes to collect statistics data from a network element ("NE") in response to a statistics collecting task, the statistics data is stored in a uniquely partitioned database.

Additional features and benefits of the exemplary embodiment(s) of the present invention will become apparent from the detailed description, figures and claims set forth below.

BRIEF DESCRIPTION OF THE DRAWINGS

Exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
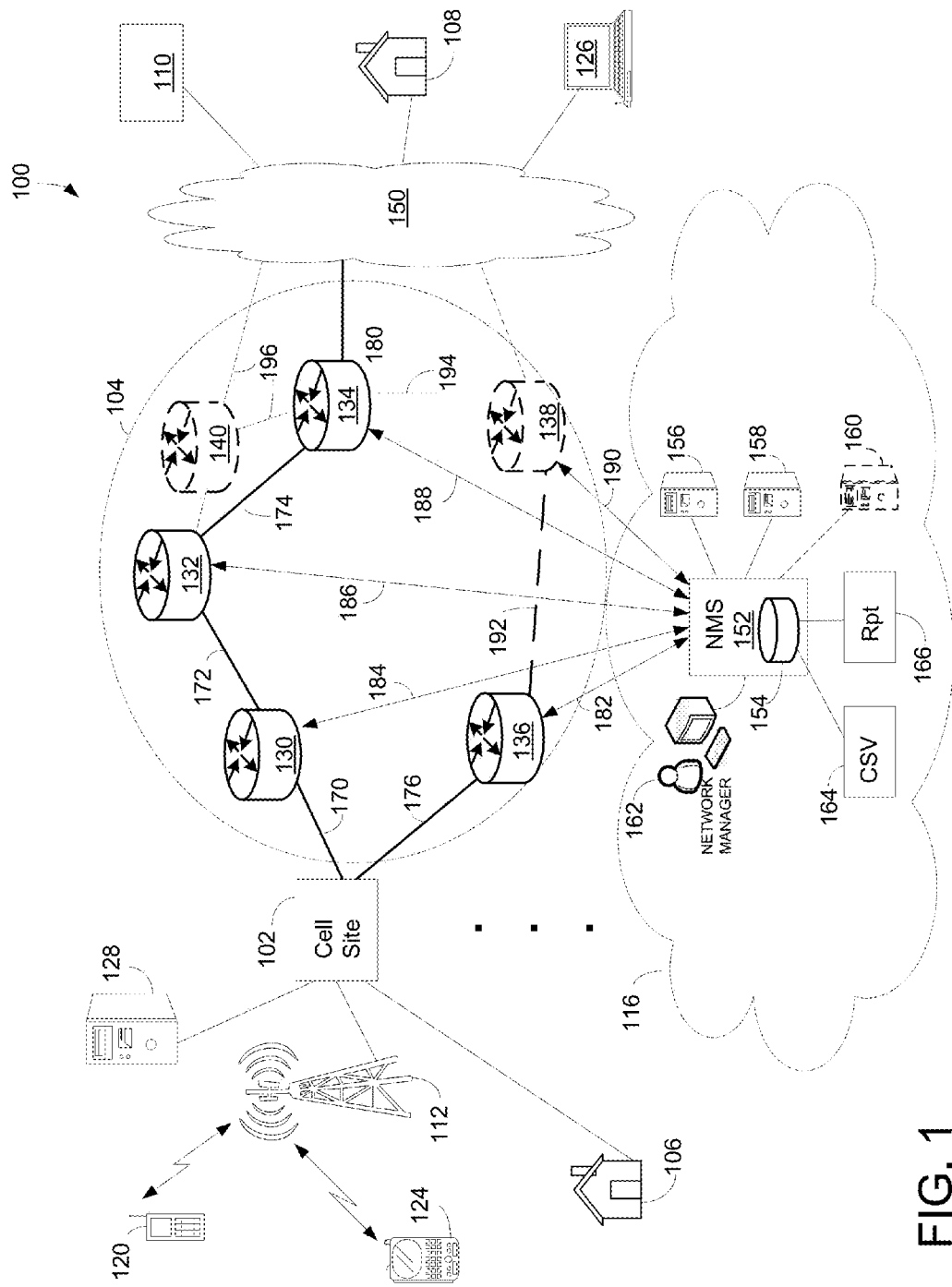
FIG. 1 is a block diagram illustrating a computer network having various nodes capable of collecting statistics data using scalable stateless processes in accordance with one embodiment of the present invention.

Exemplary embodiment(s) of the present invention is described herein in the context of a method, system and apparatus of collecting statistics data from various network elements or nodes over a communications network using scalable stateless processes.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

References to "one embodiment," "an embodiment," "example embodiment," "various embodiments," "exemplary embodiment," "one aspect," "an aspect," "exemplary aspect," "various aspects," et cetera, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

In accordance with the present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof.

The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to the block and flow diagrams, are typically performed in a different serial or parallel ordering and/or by different components and/or over different connections in various embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment (s) of the disclosure unless otherwise defined.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Embodiments of the present invention disclose a method and/or apparatus for collecting statistics data over a communications network using scalable stateless processes. Upon detecting a delay associated with the availability of statistics data in accordance with a predefined lagging duration, the process, in one embodiment, is able to add additional stateless processes to increase the capacity of processing power. After enabling a stateless process to collect the statistics data from a network element ("NE") in response to a statistics collecting task, the statistics data is obtained and stored in a customized partitioned database.

FIG. 1 is a block diagram 100 illustrating a computer network having various nodes capable of collecting statistics data using scalable stateless processes in accordance with one embodiment of the present invention. Diagram 100 includes a cell site 102, a switching network 104, a central office ("CO") 116, and Internet 150. Internet 150 is further coupled with a user 108, a content provider 110 such as a website, and a computing machine 126. Internet 150 is capable of facilitating network communication between users 106-108 via switching network 104 and cell site 102. It should be noted that the underlying concept of the exemplary embodiment(s) of the present invention would not change if one or more blocks (or devices) were added to or removed from diagram 100.

Cell site 102, also known as a base station or node B, includes a radio tower 112, user 106, and a server 128, wherein radio tower 112 is further coupled to a cellular phone 120 and a handheld device 124 via wired or wireless communications. Cell site 102 is capable of communicating with mobile devices such as cellular phone 120 and handheld device 124 via radio tower 112. It should be noted that cell site 102 may include additional radio towers as well as other land based switching circuitry. The cell stations such as cell site 102 can be configured to support wireless communications as well as wired communications.

Switching network 104, as indicated in FIG. 1, is capable of transporting or routing information (or packets) between users and/or providers connected to the communications network. In one embodiment, network 104 includes NEs 130-140 which are also known as nodes and/or routers. An NE, as a logical network entity, is able to manage one or more physical network devices, wherein the physical network devices includes, but not limited to, routers, modems, hubs, bridges, servers, or switches. NEs 130-140 are interconnected via connections 170-176 and are used for routing information and/or data packets to and from network clients or users. Network client in one example may include one or more routers, switches, hosts, users, base stations, and the like. For example, switching network 104 uses NEs 130-134 to route data traffic or packet streams between users 102, 108 via cell site 102 and Internet 150.

NEs 130-140, in one embodiment, are routers, switches, bridges, or a combination of routers, switches, and bridges. The total number of NEs used in switching network 104 may increase or decrease over time depending on the demand of network services. For example, with increasing popularity of video and/or audio service demand, the size of a network as illustrated in diagram 100 can grow to meet such demand. An aspect of growing a network is to add additional NEs into an existing pool of NEs to expand the processing capacity. For instance, NEs 138-140 are recently added NEs to the pool of NEs 130-136 for expanding the routing or processing capacities. Switching network 104 can grow or expand its NEs into hundreds or thousands depending on the network service demand. Dotted lines of NEs 138-140 as well as connections 192-196 illustrate that they are newly added or will be added.

During an exemplary operation, when user 106 sends a packet to user 108, the packet travels from cell site 102 to routers 130-134 via connections 170-174. After the packet enters Internet 150 via connection 180, it is subsequently received by user 108. To route and facilitate data traffic efficiently, NEs 130-140 in switching network 104 are required to be managed and monitored. To monitor network performance, CO 116, in one embodiment, deploys a network management system ("NMS") 152 or other performance monitoring system to monitor status of switching network 104 based on statistics generated by NEs such as NEs 130-140.

Referring back to FIG. 1, CO 116 includes NMS 152, computers or servers 156-158, network administrator 162, a CSV file system 164, and a reporting system 166. NMS 152 further includes a database 154, which, for example, can be a commercially available relational database manufactured by Oracle® Corporation. Based on contents stored in database 154, NMS 152 can generate CSV files 168 and/or reporting system 166 can generate various types of reports and/or statements in response to users' requests. The underlying concept of the exemplary embodiment(s) of the present invention would not change if additional devices such as servers and routers were added to or removed from CO 116.

Computers 156-158 can be any types of digital processing servers, such as Solaris® servers, personal computers ("PCs"), workstations, et cetera. Computers 156-158 form a pool (or cluster) of servers or stateless systems capable of scaling up or down the processing power (or capacities) in response to the number of NEs in switching network 104. NMS 152, in one embodiment, deploys computers 156-158 to collect statistics data from NEs 130-140 in switching network 104 via connections 182-190. When NMS 152 is unable to make statistics data available at database 154 within predefined or expected time duration, additional computing machine 160 illustrated in dotted lines can be added to the cluster of stateless systems 156-158 to expand overall computing and/or processing capacity.

Servers or computers 158-160 form a pool of stateless systems that can be scaled up when additional computing power is needed. The pool of stateless systems can also be scaled down when current processing power are not fully utilized. When NMS 152 detects a delay of availability of statistics data, computer 160 illustrated in dotted line is added to the pool of computers 156-158 for expanding pool's processing capacity. Each of computers 158-160, in one embodiment, includes one or more stateless processes or stateless containers capable of independently processing and/or executing task(s) associated with collecting statistics data from NEs.

NE statistics, in one embodiment, are collected in periodic intervals and processed by NMS 152. When new NEs are added to the existing pool of NEs 130-126, statistics collector needs to scale up accordingly to keep up with the growth of switching network 104. To implement scalability requirements, one or more lightweight stateless processes can be dynamically added or removed depending on the processing needs. The lightweight stateless process means a relatively small and simple process or small virtual machine that does not require sophisticated hardware support. In one embodiment, scalable system includes a scheduler, orchestrator, and a customized partitioned database.

An advantage of using the embodiments of the present invention is to dynamically add computing power as well as storage to cope with continuously expanding network. With dynamically distributing and allocating statistics data tasks by scheduler and orchestrator, additional stateless containers can be launched when there is a need.

Another advantage of employing the embodiments of the present invention is to partition database ("DB") efficiently thereby the unique DB partitioning technique can support larger volume of reads and writes. As such, interference between statistics write operations and statistics read operations is reduced.

Figure 2:
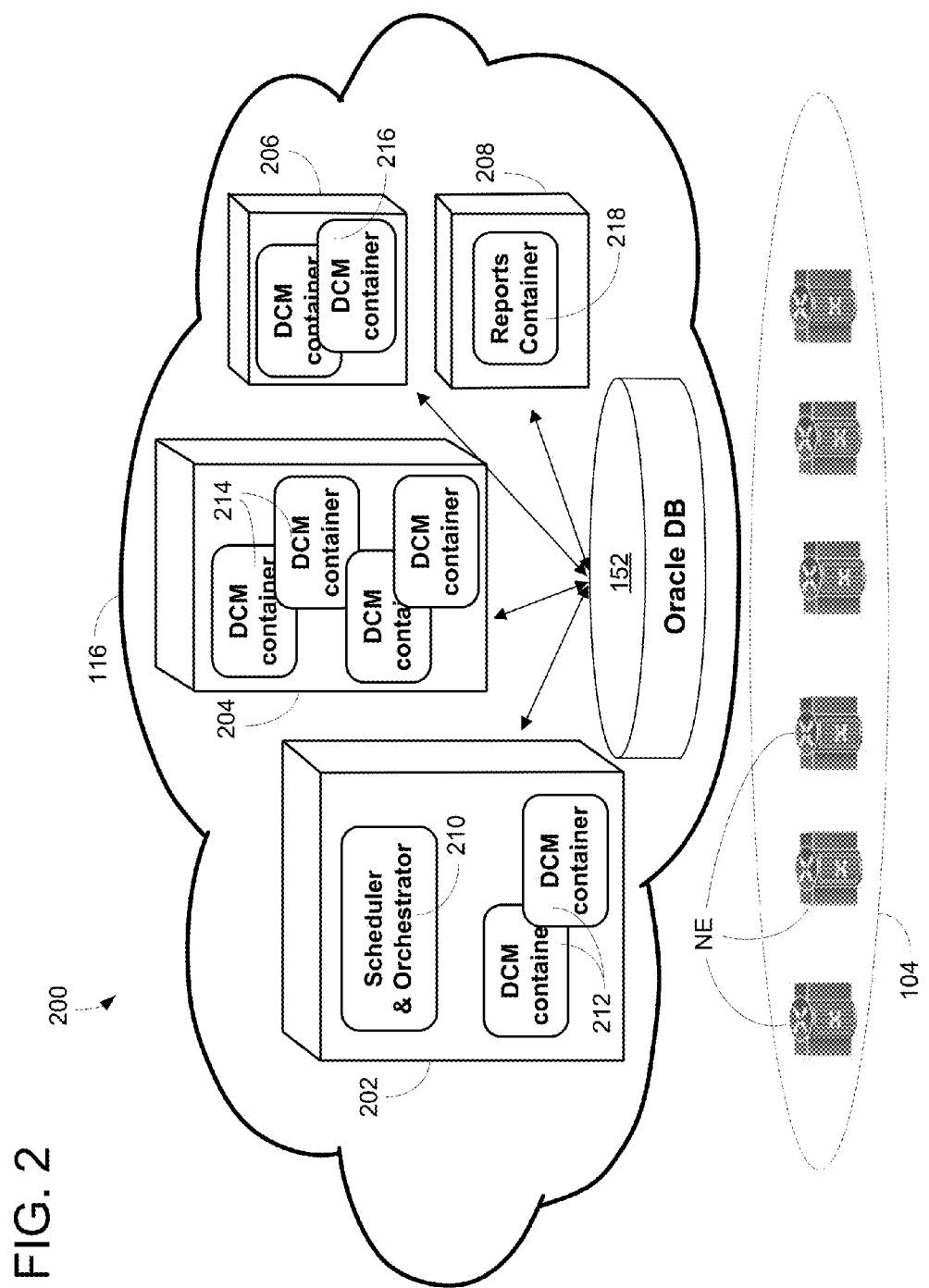
FIG. 2 is a block diagram illustrating network devices capable of collecting statistics data using stateless processes in accordance with one embodiment of the present invention.

FIG. 2 is a block diagram 200 illustrating network devices capable of collecting statistics data using scalable stateless processes in accordance with one embodiment of the present invention. Diagram 200 includes switching network 104 and CO 116 wherein switching network 104 includes multiple NEs for routing and processing packet streams. CO 116 further includes multiple computers 202-208 and DB 152 which could be an Oracle® relational DB. It should be noted that the underlying concept of the exemplary embodiment(s) of the present invention would not change if one or more devices (or blocks) were added to or removed from diagram 200.

Computer 202 includes a scheduler and orchestrator module 210 and stateless processes 212. In one embodiment, stateless processes 212 are configured to be data collection manager ("DCM") containers which are capable of collecting statistics data from one or more NEs in accordance with one or more DCM tasks. In one example, DCM containers can be lightweight stateless processes such as Java Virtual Machines ("JVMs") which can run on different physical servers. DCM tasks, in one embodiment, are generated by scheduler and orchestrator module 210, and provide statistics collecting instructions to DCM container(s).

Scheduler and orchestrator module 210 includes a scheduler and orchestrator wherein the scheduler identifies when to start a collecting process based on a predetermined time period or intervals. For example, one schedule may instruct DCM container(s) to collect a type of statistics data while another schedule instructs to collect a second type of statistics data. The orchestrator determines how to collect the statistics data and where to distribute the tasks or DCM tasks. For example, the orchestrator may divide a large task into several smaller tasks and distribute tasks to various stateless processes for implementation. It should be noted that scheduler and orchestrator can be separate modules or can reside in different computer systems.

Stateless processes, in one example, can run on any types of digital processing machines such as PCs, servers, laptops, workstations, et cetera. Because the processes are stateless, they can go to any node or NE to collect or obtain relevant statistics. Note that the terms "stateless process," "DCM container," and "lightweight stateless process," can be used interchangeably. In one embodiment, DCM containers can be dynamically added or removed based on the processing need. For example, when a network such as switching network 104 grows, more statistics data needs to be collected and consequently, it takes longer to complete statistics data collection per every time interval. When NMS detects a delay of completion of the statistics data collection, additional stateless containers can be added to speed up statistics data collection. The scalable statistics collection system can horizontally scale up to keep up with the growth of a network. Note that adding DCM containers may require adding additional hardware such as systems containing DCM containers or stateless processes.

Computers 204-206 include multiple DCM containers 214-216. It should be noted that DCM containers 214-216 may be similar stateless processes or different stateless processes. Computer 208 includes a reports container 218 which is capable of generating various types of reports or invoices based on statistics data stored in DB 152. Note that computer 208 may include other modules such as DCM containers.

DB 152, in one embodiment, is a relational database capable of being partitioned based on user's requirements. For example, DB 152 can be Oracle® relational database which is capable of storing statistics table and can be partitioned. In one embodiment, DB 152 is partitioned into two levels wherein the level stores statistics data based on calendar day (or day of month) while the second level stores statistics data based on collection time interval. DB 152, in one example, can be partitioned in such a way that operation interference between a read operation of statistics data and a write operation of statistics data is minimized.

An advantage of partitioning DB 152 into two levels is to enhance data maintenance and simplify implementation. For example, deleting old data can be easily achieved by dropping one or both partitions. The statistics data stored in DB 152 is generally more flexible than information contained in CSV files. For example, statistics data in DB 152 can be queried, sorted, and searched, and if a user requests the statistics in file formats, CSV files can be generated from the stored statistics data in DB 152.

Another advantage to use embodiments of the present invention is minimal hardware support for collecting statistics data from NEs. For example, stateless processes or DCM containers can be established with minimal hardware and they can scale up overtime when the network and/or NEs grow.

Figure 3:
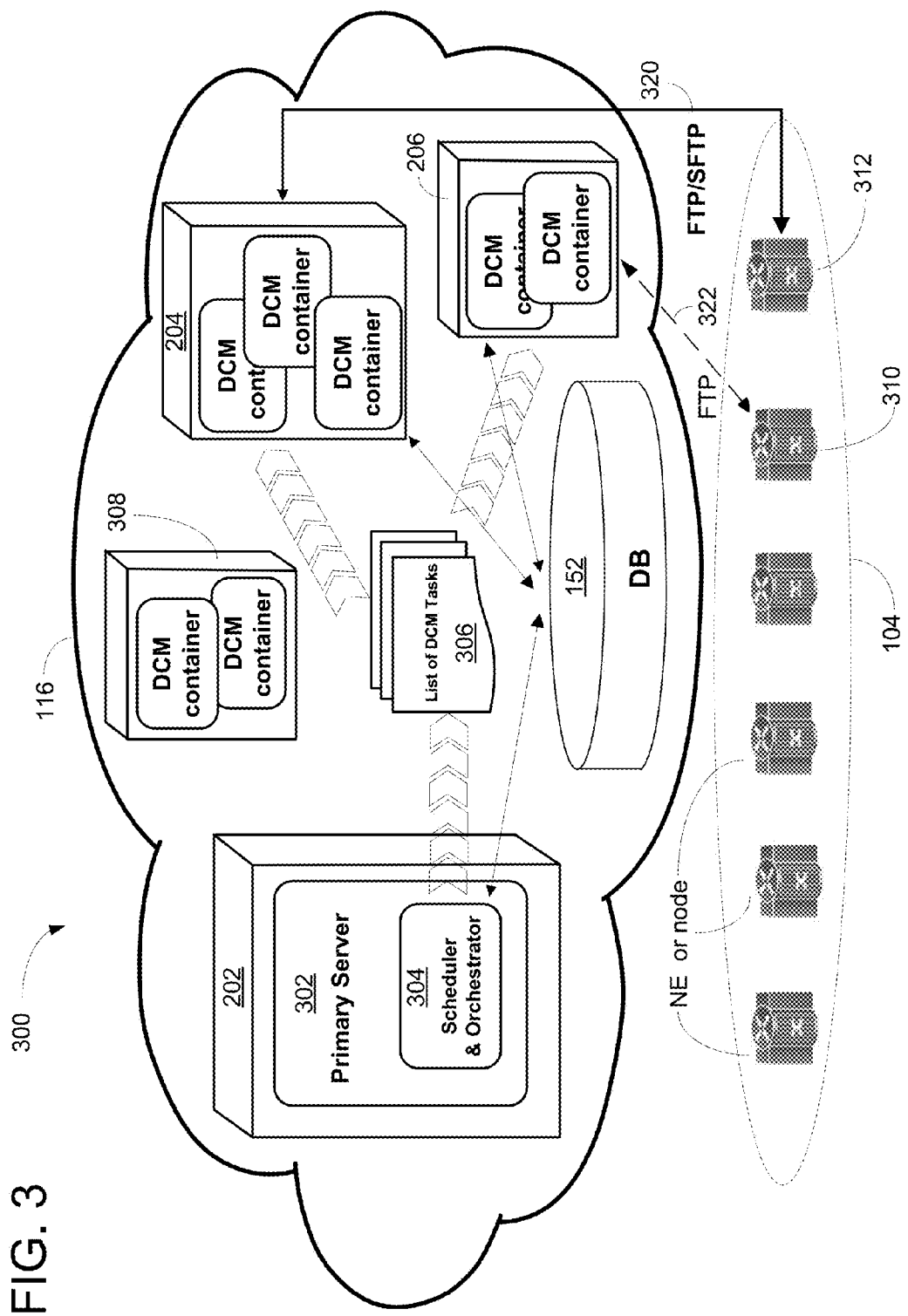
FIG. 3 is a block diagram illustrating a system capable of implementing scalable stateless processes using scheduler and orchestrator module in accordance with one embodiment of the present invention.

FIG. 3 is a block diagram 300 illustrating a system capable of implementing scalable stateless processes using scheduler and orchestrator module in accordance with one embodiment of the present invention. Diagram 300 includes switching network 104 and CO 116 wherein switching network 104 includes multiple NEs or nodes for routing and/or packet processing. CO 116 further includes multiple computers 202-206 and a DB 152 which could be an Oracle® relational DB. In one embodiment, computer 308, which may include one or more DCM containers or light-weight stateless processes, is a stateless computing machine capable of providing scalable stateless processes. For example, computer 308 can be added to increase statistics data collecting capacity. It should be noted that the underlying concept of the exemplary embodiment(s) of the present invention would not change if one or more devices (or blocks) were added to or removed from diagram 300.

In addition to NEs, switching network 104 may further include backup routers, mobile routers, bridges, et cetera. Statistics data generated by each NE or node may include device bandwidth, storage capacity, traffic flows, usage, and so forth. NMS and/or performance manager, in one embodiment, uses File Transfer Protocol ("FTP") 322 or Secure File Transfer Protocol ("SFTP") 320 to download statistics data from NEs. After processing and storing the downloaded statistics data, various reports including billing statements can be generated by the reports container. FTP and SFTP are TCP/IP (Transmission Control Protocol/Internet Protocol) based network protocols capable of transfer file(s) between network systems. It should be noted that scalable stateless processes may use other network data transfer protocol to obtain statistics data from NEs instead of using FTP or SFTP as long as the other network data transfer protocol performs similar functions as FTP or SFTP.

A scalable statistics collector, in one embodiment, includes a scheduler and orchestrator module 304 residing in a network server 302 configured to generate a list of data collecting tasks 306. Data collecting tasks 306, for example, provide instructions and/or code executable by DCM containers to instruct when and how to collect statistics data from various network nodes or NEs. DCM containers or stateless processes residing in computers 204-206 are configured to obtain information from various network nodes or NEs in accordance with the list of data collecting tasks 306. DB 152, in one example, is capable of storing the statistics data collected from one or more network nodes such as NEs 310-312 via FTP file transfers 320-322. DB 152, in one embodiment, is an Oracle® database which can be partitioned in multiple levels to minimize performance impact between a write operation and a read operation of statistics data. Note that Oracle® relational database is able to facilitate and create different kind of useful applications such as reports, performance monitoring, and billings.

The scalable statistics collector, in one example, may add additional stateless processes or DCM containers running on computer 308 when processing capacity of existing stateless processes is insufficient to complete the collection of statistics data from all nodes within predefined time duration. It should be noted that each network node or NE may include a computer, a server, a mobile device, or a cluster of systems coupled to the communications network. List of data collecting tasks 306, in one example, is a list of DCM tasks specifying where to download the statistics data. When creating a schedule indicating a type DCM, various application specific parameters including node settings and templates are composed on the list of DCM tasks. Note that a NodeSet or node setting is a group of nodes after a grouping process whereby a type of statistics data can be collected at the same collecting interval or duration. Note that Template is used to specify which PM statistics data to collect from one or more NEs.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 4:
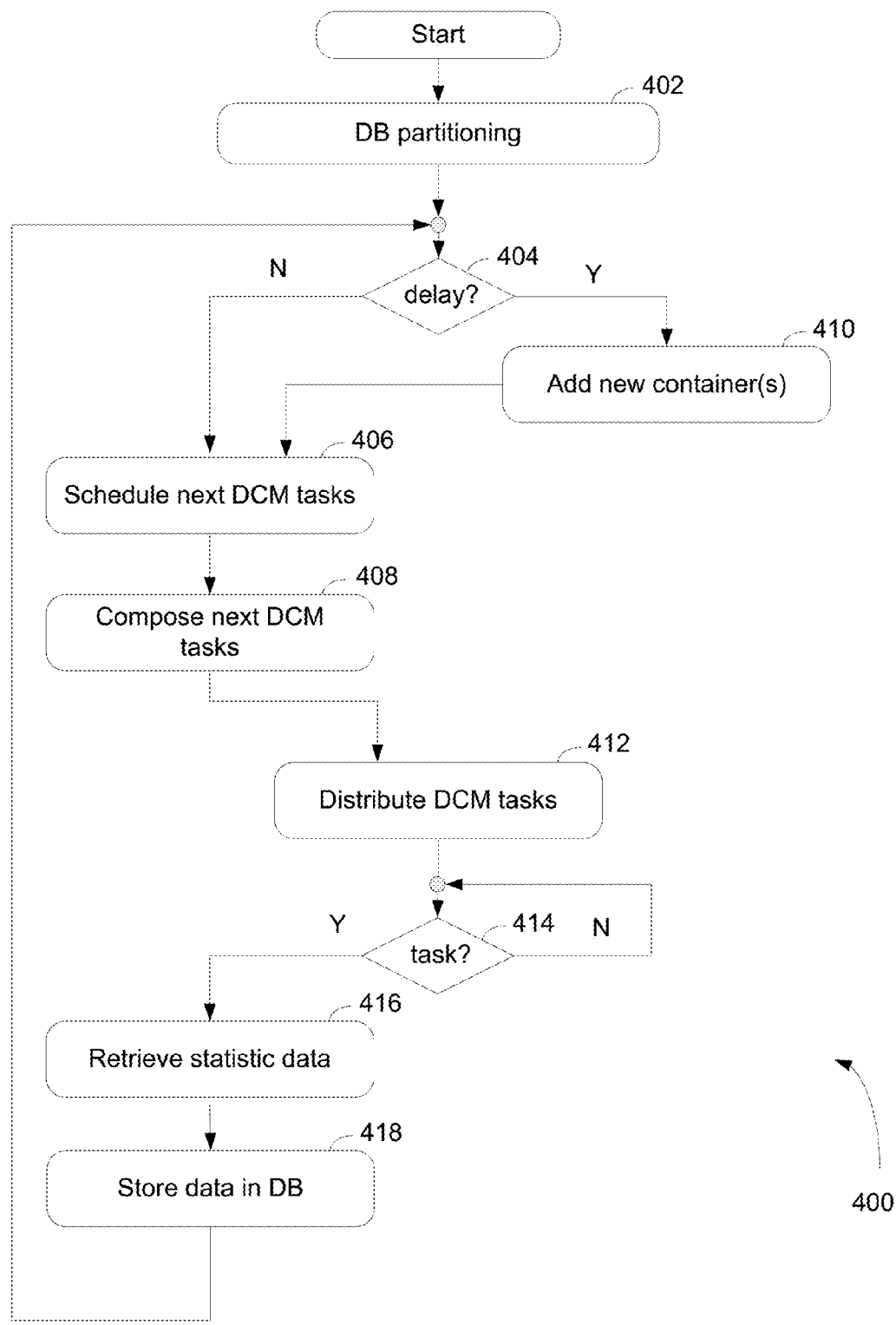
FIG. 4 is a flowchart illustrating a process of performing database partitioning, adjusting stateless processes, and collecting statistics data in accordance with one embodiment of the present invention.

FIG. 4 is a flowchart 400 illustrating a process of performing database partitioning, adjusting stateless processes, and collecting statistics data in accordance with one embodiment of the present invention. At block 402, the process partitions a relational database into user preferred levels or partitions such as a daily level and an interval level. The daily level, for example, is a partition based on a calendar year and the interval level is a partition based on the time in which the statistics data is collected. In one example, Oracle® relational database is used as the database for storing the statistics data. After partitioning, a portion of Oracle® relational database, for instance, is allocated or partitioned in accordance with calendar dates, while another portion of Oracle® relational database is allocated in accordance with time intervals in which the statistics data is collected.

At block 404, the process examines whether there is a delay associated with the availability of statistics data in accordance with a predefined expected time period. For example, the process detects a delay or lagging statistics data if the delay is greater than the predefined expected time period. Note that the predefined expected time period is the time needed to fetch or obtain statistics data from NEs under normal conditions. If a delay is determined, the process proceeds to block 410. Otherwise, the process moves to block 406.

At block 410, one or more stateless DCM containers are added to a pool of existing DCM containers to increase processing or collecting power. In one embodiment, the process activates an additional computer which is loaded with one or more DCM containers. It should be noted that depending on the applications, detecting a delay and adding a DCM container(s) may not occur automatically. For example, a network administrator may manually add and/or activate one or more DCM containers upon detecting a delay.

At block 406, the scheduler module identifies the predefined time interval wherein each time interval triggers a statistics collection procedure. At block 408, the orchestrator module determines how to collect the statistics data and where to distribute the tasks or DCM tasks. After composing or generating a list of DCM tasks for a particular time interval, the list is distributed to various DCM containers for processing or execution at block 412.

At block 414, DCM containers or scalable stateless processes receive DCM task or tasks in view of the list. If no tasks are needed to be processed, DCM containers wait for new task list(s). Otherwise, the process proceeds to block 416.

At block 416, DCM containers collect statistics data from NEs in the communications network in response to a list of tasks. In one embodiment, FTP is used to copy or fetch the statistics file from NEs. Alternatively, SFTP may be used in place of FTP to obtain the statistics from NEs.

At block 418, upon retrieving the statistics data from the NEs, the statistics data is stored in the relational database in accordance with the daily level and/or the interval level. The stored statistics data, for example, can be searched and categorized in customers' or users' preferences. A status report or billing statement may be generated in accordance with the statistics data stored in the relational database.

Figure 5:
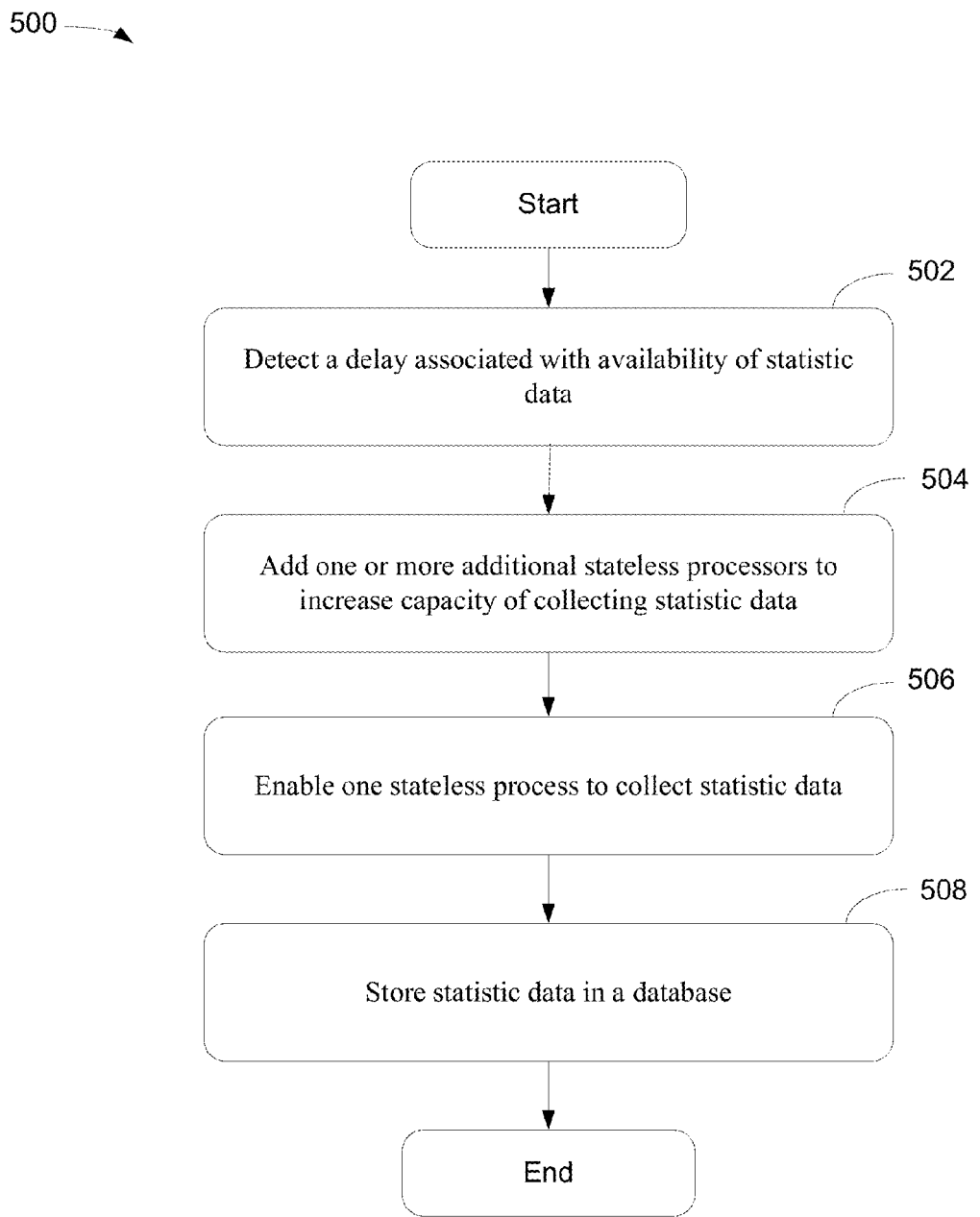
FIG. 5 is a flowchart illustrating a process of collecting statistics data and processing collected statistics using scalable stateless processes in accordance with one embodiment of the present invention.

FIG. 5 is a flowchart illustrating a process of collecting statistics data and processing collected statistics using scalable stateless processes in accordance with one embodiment of the present invention. At block 502, a process of collecting statistics data monitors and detects a delay or lag associated with the availability of statistics data in accordance with a predefined waiting period. In one embodiment, a lag or delay is identified when the delay is greater than the predefined waiting period. It should be noted that the predefined waiting period which can be calibrated by a user is the time needed for fetching the statistics data from NEs.

At block 504, the process is able to add one or more additional stateless processes to a pool of existing stateless processes to increase processing or computing power for statistics collection. In one embodiment, an additional computer having one or more stateless DCM containers capable of collecting statistics data from one or more NEs is added to a group of computers or servers configured to run DCM containers.

At block 506, the process enables one of the stateless processes to collect statistics data from a NE in response to one of the list of statistics collecting tasks. In one example, the process instructs a stateless process or DCM container to download statistics data from a node or NE over a network via FTP. The DCM container fetches statistics data in accordance with a DCM task generated by the scheduler and orchestrator.

At block 508, the statistics data is downloaded, processed, and stored in a database. In one embodiment, the statistics data is stored in a customized partitioned Oracle® database. The statistics data, for example, can be searched and identified from the database and a relevant report such as a status report associated with the statistics data can be generated. CSV file based on information stored in the database may be generated. Note that the scheduler provides information relating to time to start a particular DCM task and the orchestrator provides information relating to specific tasks or actions to be performed.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for collecting statistics data over a communications network, comprising:
    detecting a delay associated with availability of statistics data collected from a plurality of network elements ("NEs") in accordance with a predefined time period;
    determining insufficient processing capacity of stateless processes to complete collecting statistics data from all nodes within predefined time duration in response to the delay;
    adding one or more additional stateless processes to a pool of stateless processes for scaling up computing power in response to the delay to increase capacity of collecting statistics data;
    enabling one of the pool of stateless processes to collect statistics data from an NE in response to one of a list of statistics collecting tasks, wherein enabling one of the pool of stateless processes includes fetching the statistics data in response to a data collection manager ("DCM") task generated by a scheduler; and
    storing the statistics data in a database.

2. The method of claim 1, further comprising,
    fetching the statistics data from the database; and
    generating a status report associated with the NE in accordance with the statistics data.

3. The method of claim 1, further comprising generating a comma-separated values ("CSV") file based on information stored in the database.

4. The method of claim 1, wherein detecting a delay associated with availability of statistics data further includes:
    identifying a predefined waiting period needed for fetching the statistics data from an NE for a predefined time interval; and
    determining duration of the delay is greater than the predefined waiting period.

5. The method of claim 1, wherein adding one or more additional stateless processes to a plurality of stateless processes includes coupling an additional computer, having one or more stateless data collection manager ("DCM")

containers capable of processing one or more DCM tasks, to a group of computers containing a plurality of DCM containers.

6. The method of claim 1, wherein enabling one of the plurality of stateless process to collect statistics data from an NE includes obtaining the statistics data from a node over a network employing file transfer protocol ("FTP").

7. The method of claim 1, wherein fetching the statistics data in response to a data collection manager ("DCM") task includes generating the DCM task in response to input from orchestrator.

8. The method of claim 7, further comprising activating the scheduler to generate information relating to time of each DCM task to be executed.

9. The method of claim 8, further comprising enabling the orchestrator to generate information relating to tasks listed in the DCM task.

10. The method of claim 1, wherein storing the statistics data in a database includes storing the statistics data in a customized partitioned Oracle® database.

11. A communications network, comprising:
a scheduler and orchestrator module in a network server coupled to the communications network and configured to generate a list of data collecting tasks for obtaining statistics data from various network nodes, wherein the scheduler and orchestrator module is configured to determine insufficient processing capacity of stateless processes for collecting statistics data from all nodes within predefined time duration;
a pool of stateless processes residing in one or more network devices coupled to the scheduler and orchestrate module and configured to collect information from the various network nodes in accordance with the list of data collecting tasks, wherein a stateless process is dynamically added to or removed from the pool of stateless processes for increasing or reducing capacity of collecting statistics data in accordance with computing power needed to perform data collecting within a predefined time period; and
a database coupled to the plurality of stateless processes and capable of storing the statistics data collected from one or more network nodes.

12. The network of claim 11, further includes a scalable module coupled to the scheduler and orchestrator and operable to add additional stateless processes to the plurality of stateless processes when processing capacity of the plurality of the stateless processes is insufficient to collect statistics data from the network nodes within a predefined time interval.

13. The network of claim 12, wherein each network node is a network elements ("NEs") including a computer, a server, a mobile device, or a cluster of systems coupled to the communications network.

14. The network of claim 13, wherein a list of data collecting tasks is a list of data collection manager ("DCM").

15. The network of claim 11, wherein the database is an Oracle® database which is partitioned in multiple levels to minimize performance interference between a write operation and a read operation of statistics data.

16. A method for collecting statistics over a communications network, comprising:
partitioning a relational database into a daily level and an interval level;
detecting a delay associated with availability of statistics data collected from a plurality of network elements ("NEs") in accordance with a predefined expected period;
determining insufficient processing capacity of stateless processes to complete collecting statistics data from all nodes within predefined time duration in response to the delay;
adding one or more stateless processes to a pool of existing stateless processes for scaling up computing power in response to the delay to increase capacity of processing power;
collecting statistics data from NEs of the communications network in response to a list of tasks; wherein collecting statistics data includes fetching statistics data in response to a data collection manager ("DCM") task generated by a scheduler; and
storing the statistics data in the relational database in accordance with the daily level and the interval level.

17. The method of claim 16, further comprising,
searching and fetching the statistics data stored in the relational database; and
generating a status report in accordance with the statistics data.

18. The method of claim 16, wherein partitioning a relational database into a daily level and an interval level further includes:
allocating a portion of Oracle® relational database in accordance with a calendar dates; and
allocating another portion of Oracle® relational database in accordance with a collection time interval.

19. The method of claim 16, wherein detecting a delay associated with availability of statistics data in accordance with a predefined expected duration further includes:
identifying duration of the predefined expected period which is time needed to fetch the statistics data; and
determining duration of the delay is greater than the duration of the predefined expected period.

20. The method of claim 16, wherein adding one or more stateless processes to a pool of existing stateless processes includes coupling an additional computer, having one or more stateless data collection manager ("DCM") containers capable of processing one or more DCM tasks, to a group of computers containing a plurality of DCM containers.

* * * * *